(12) United States Patent
Gretz

(10) Patent No.: US 8,212,144 B1
(45) Date of Patent: Jul. 3, 2012

(54) GANGABLE MODULAR ELECTRICAL BOX ASSEMBLY WITH INTERLOCKING MODULES

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 367 days.

(21) Appl. No.: 12/657,759

(22) Filed: Jan. 27, 2010

(51) Int. Cl.
*H01H 9/02* (2006.01)

(52) U.S. Cl. ............ 174/58; 174/50; 174/53; 174/480; 220/3.2; 220/3.3; 248/906

(58) Field of Classification Search .............. 174/480, 174/481, 50, 53, 57, 58, 61, 63; 220/3.2–3.9, 220/4.02; 248/906; 439/535
See application file for complete search history.

(56) References Cited

U.S. PATENT DOCUMENTS

| | | | |
|---|---|---|---|
| 4,428,492 A * | 1/1984 | Jorgensen | 174/58 |
| 4,612,412 A * | 9/1986 | Johnston | 174/58 |
| 5,378,854 A * | 1/1995 | Hoover | 174/53 |
| 5,509,560 A | 4/1996 | Nash | |
| 5,619,013 A | 4/1997 | Jorgensen | |
| 6,057,509 A | 5/2000 | Simmons | |
| 6,229,087 B1 | 5/2001 | Archer | |
| 6,576,835 B1 * | 6/2003 | Ford et al. | 174/50 |
| 6,903,272 B2 | 6/2005 | Dinh | |
| 6,914,187 B2 * | 7/2005 | Hull et al. | 174/50 |
| 7,214,875 B1 * | 5/2007 | Gretz | 174/53 |
| 7,595,446 B2 * | 9/2009 | Turcovsky et al. | 174/50 |
| 7,659,478 B2 * | 2/2010 | Schlachter | 174/58 |
| 8,088,998 B2 * | 1/2012 | Nelson | 174/50 |

* cited by examiner

*Primary Examiner* — Angel R Estrada

(57) ABSTRACT

A gangable modular electrical box including separate modules that can be combined in various configurations to provide a desired amount of electrical enclosures on a wall. The modules include an end module and an optional inner module that are each molded in one piece of plastic. A rapid alignment and connection arrangement is included on the various modules to facilitate easy assembly of the modules at the job site without the use of sophisticated tools. The modules can be combined to form a two-gang, three-gang, or larger ganged box as desired. In the simplest configuration, two end modules can be combined to create a two-gang electrical box.

16 Claims, 14 Drawing Sheets

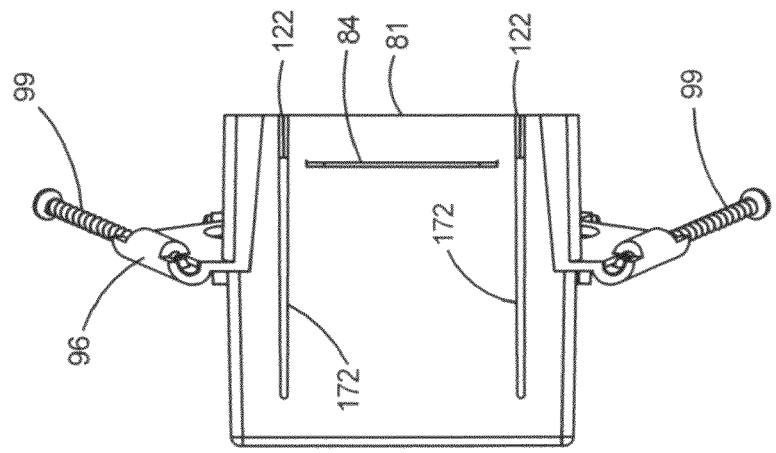
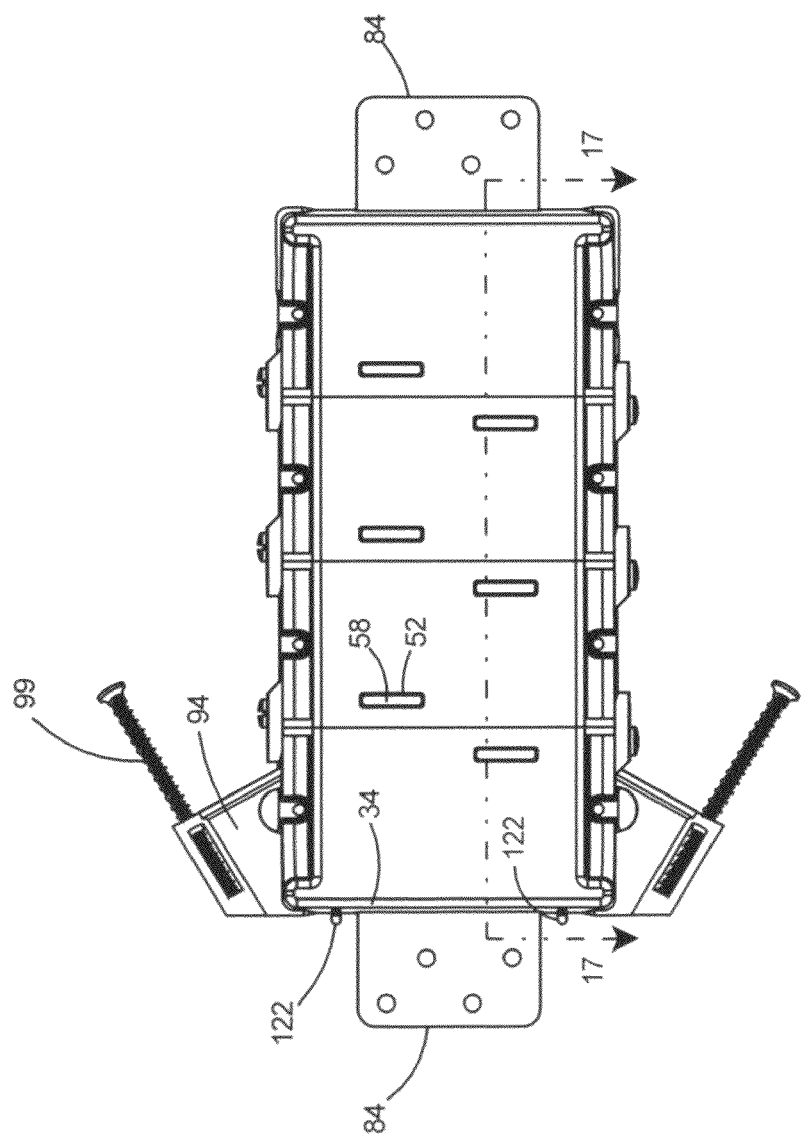
Fig. 8
Fig. 7

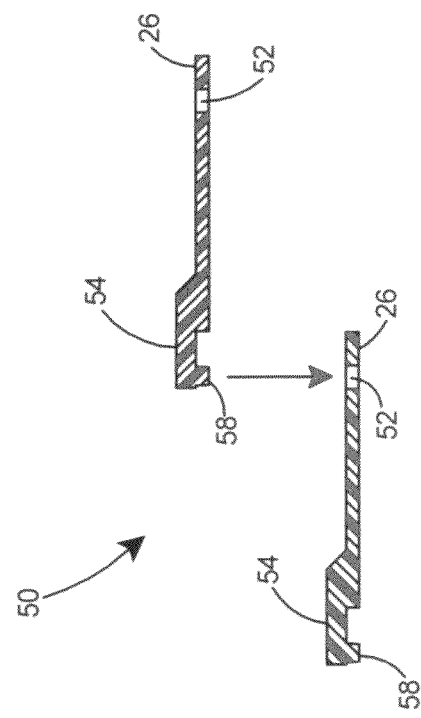
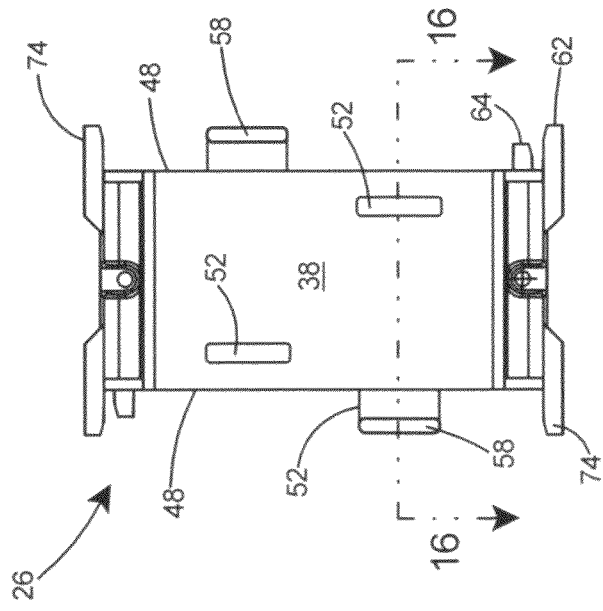
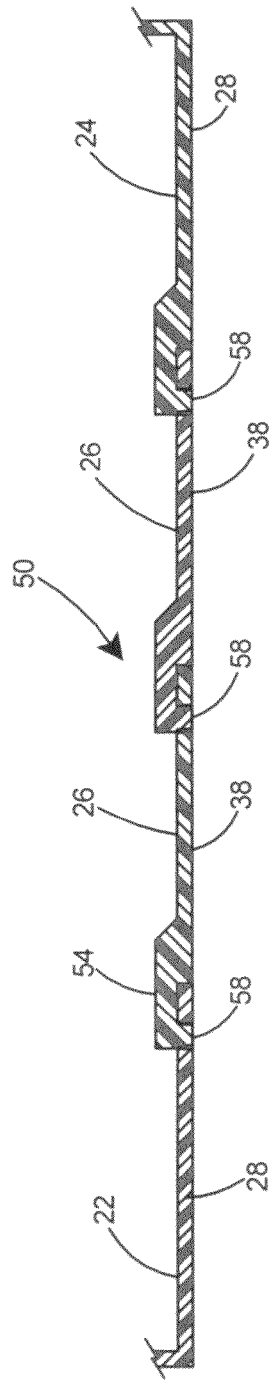

GANGABLE MODULAR ELECTRICAL BOX ASSEMBLY WITH INTERLOCKING MODULES

FIELD OF THE INVENTION

This invention relates to assemblies for the mounting of electrical devices and specifically to a gangable modular electrical box assembly that includes interlocking modules that can be joined together by an installer at the job site to form an electrical box having a desired number of electrical compartments.

BACKGROUND OF THE INVENTION

With the plethora of electrical devices found in the modern household, it is frequently necessary to install additional electrical receptacles to provide the required number of outlets. Although outlets can be provided by power strips, these devices are likely to be unsightly and difficult to child-proof as compared to outlets installed in the wall.

Many types of electrical boxes are commercially available, including single receptacle boxes, two-gang boxes, three-gang boxes, and so on. However, it would be beneficial to an installer to have available at the job site the ability to assembly a multi-gang box of the correct size to satisfy the requirements of a particular room or area. What is needed is a configurable multi-gang box that can be configured as a two-gang box, a three-gang box, or even larger box as the situation requires.

Although several multi-gang boxes have been proposed, many of them cannot be easily assembled and configured by a single electrician or homeowner. Thus, as additional electrical outlets are typically installed by a single person, it is beneficial to provide a configurable multi-gang box that can be easily configured and installed at the job site by a single installer.

SUMMARY OF THE INVENTION

The invention is a gangable modular electrical box including separate modules that can be combined in various configurations to provide a desired amount of electrical enclosures on a wall. The modules include an end module and an optional inner module that are each molded in one piece of plastic. A rapid alignment and connection arrangement is included on the various modules to facilitate easy assembly of the modules at the job site without the use of sophisticated tools. The modules can be combined to form a two-gang, three-gang, or larger ganged box as desired. In the simplest configuration, two end modules can be combined to create a two-gang electrical box.

OBJECTS AND ADVANTAGES

A first object of the gangable modular electrical box of the present invention is to provide modular components that can be easily and rapidly assembled at the job site by a single installer to create a multi-gang electrical box.

A second object of the gangable modular electrical box of the present invention is to provide an installer the ability to rapidly configure a two-gang, three-gang, or even larger multi-gang electrical box in a modular fashion.

A third object is to provide modular members that are molded of plastic in a single piece to minimize production cost.

A further object is to provide modular plastic components that include an alignment and connection arrangement is included on the various modules to facilitate easy assembly of the modules at the job site without the use of sophisticated tools.

Another object of the present invention is to provide modular components in which an alignment and connection arrangement enables the modules to be snapped together and remain connected initially until permanently fastened together.

These and other objects and advantages of the present invention will be better understood by reading the following description along with reference to the drawings.

DESCRIPTION OF THE DRAWINGS

FIG. 7 is a rear view of the gangable modular electrical box of FIG. 1.

FIG. 8 is a left side view of the gangable modular electrical box shown in FIG. 7.

FIG. 15 is a rear view of an inner module of the gangable modular electrical box according to the present invention.

FIG. 16 is two sectional views of an inner module as taken along line 16-16 of FIG. 15 illustrating the modules in alignment to be interlocked together.

FIG. 17 is a sectional view taken along line 17-17 of FIG. 7, depicting the interlocking tabs and slots of the modules of the gangable modular electrical box of the present invention.

TABLE OF NOMENCLATURE

Figure 1:
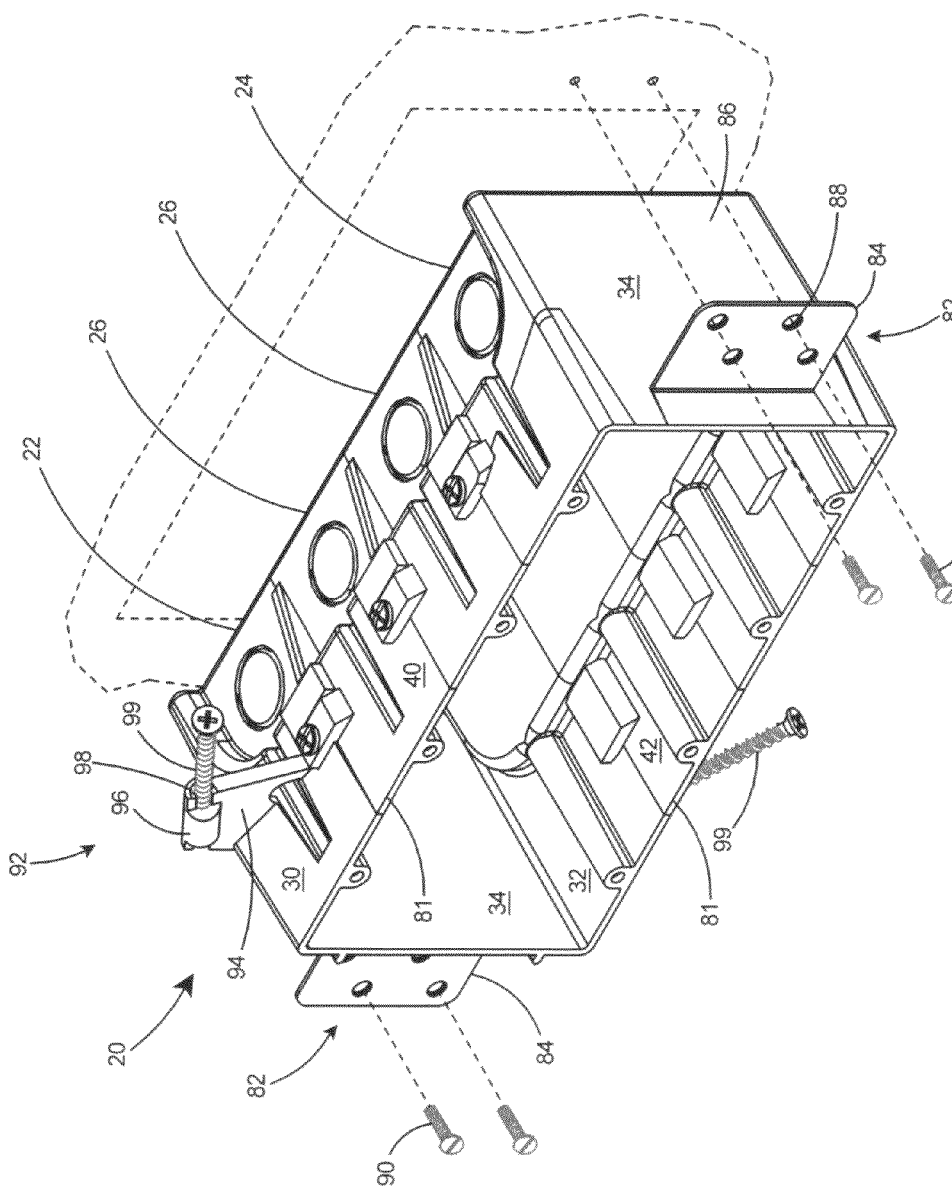
FIG. 1 is a perspective view of a first and preferred embodiment of a gangable modular electrical box according to the present invention assembled in a configuration to provide a four-gang electrical box.

The following is a listing of part numbers used in the drawings along with a brief description:

| Part Number | Description |
| --- | --- |
| 20 | gangable modular electrical box, preferred embodiment |
| 22 | first end body or first module |
| 24 | second end body or second module |
| 26 | inner body or inner module |
| 28 | back wall of end body |
| 30 | top wall of end body |
| 32 | bottom wall of end body |
| 34 | side wall |
| 36 | open side of end body |
| 38 | back wall of inner body |
| 40 | top wall of inner body |
| 42 | bottom wall of inner body |
| 44 | open side of inner body |
| 46 | side edge of end body |
| 48 | side edge of inner body |
| 50 | coupling arrangement |
| 52 | slot |
| 54 | hooked tab |
| 56 | end of hooked tab |
| 58 | hook |
| 60 | alignment arrangement |
| 62 | outer tab |
| 64 | inner tab |
| 65 | corner of body |
| 66 | outer surface of walls |
| 68 | inner surface of walls |
| 70 | gap |
| 72 | fastening arrangement |
| 74 | second tab |
| 76 | aperture in second tab |
| 78 | bore |
| 80 | fastener |
| 81 | front edge |
| 82 | first mounting arrangement |
| 84 | flange |
| 86 | outer surface of side wall |
| 88 | aperture in flange |
| 90 | mounting fastener |
| 92 | second mounting arrangement |
| 94 | wing |
| 96 | boss |
| 98 | bore |
| 99 | captive fastener |
| 100 | gangable modular electrical box, second embodiment |
| 102 | third mounting arrangement |
| 104 | open channel |
| 106 | screw plate |
| 108 | locking arrangement |
| 110 | boss |
| 112 | bore |
| 114 | arm |
| 116 | aperture in arm |
| 118 | captive fastener |
| 120 | outer surface of screw plate |
| 122 | drywall stop |
| 130 | gangable modular electrical box, third embodiment |
| 132 | fourth mounting arrangement |
| 134 | peripheral flange |
| 138 | oversize aperture |
| 140 | mounting fastener |
| 142 | rotatable flag |
| 150 | gangable modular electrical box, fourth embodiment |
| 152 | snap fit fastening arrangement |
| 154 | resilient locking tab |
| 156 | alignment tab |
| 158 | groove in locking tab |
| 160 | raised lip |
| 162 | recessed area |
| 164 | knockout |
| 166 | push-in electrical fitting or connector |
| 168 | integral boss |
| 170 | bore |
| 172 | pair of rails |
| W1 | width of the slot |
| W2 | width of the hook |

DETAILED DESCRIPTION OF THE INVENTION

With reference to FIG. 1, there is shown a first and preferred embodiment of a gangable modular electrical box 20 according to the present invention. The gangable modular electrical box 20 includes a first end body 22, a second end body 24, and optionally may include one or more inner bodies 26 which, when assembled together as shown in FIG. 1, form a multi-gang electrical box.

Figure 2:
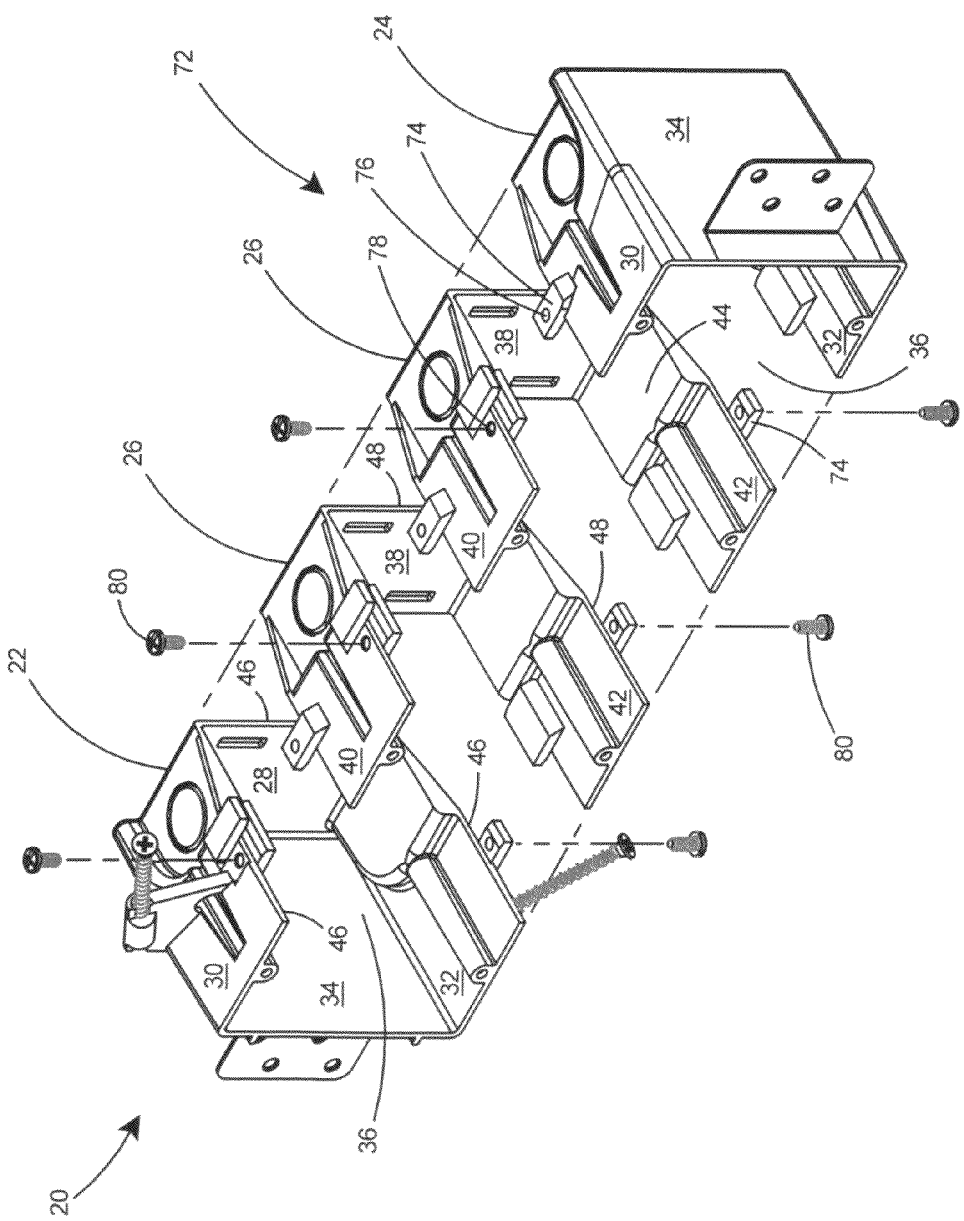
FIG. 2 is an exploded perspective view of the gangable electrical box of FIG. 1 with the modular components in alignment with each other to be assembled into a four-gang electrical box.

Referring to FIG. 2, the first and second end bodies 22 and 24 each include a back wall 28, a top wall 30, a bottom wall 32, and a side wall 34 extending substantially perpendicular from the back wall 28. One side of each of the end bodies 22 and 24 includes an open side 36. The inner bodies 26 each include a back wall 38 and a top wall 40 and a bottom wall 42 extending substantially perpendicular from the back wall 38. Each inner body 26 includes two open sides 44.

The open sides 36 of the first end body 22 and the second end body 24 include side edges 46 on the back wall 28, the top wall 30, and the bottom wall 32. The open sides 44 of each inner body 26 include side edges 48 on the back wall 38, the top wall 40, and the bottom wall 42. The side edges 46 of the first and second end bodies 22 and 24 and the side edges 48 of the inner body 26 are of substantially equal profile and dimensions thereby enabling the side edges 46 and 48 to join flush with each other when the open sides 36 and 44 of the bodies 22, 24, and 26 are joined together.

Figure 3:
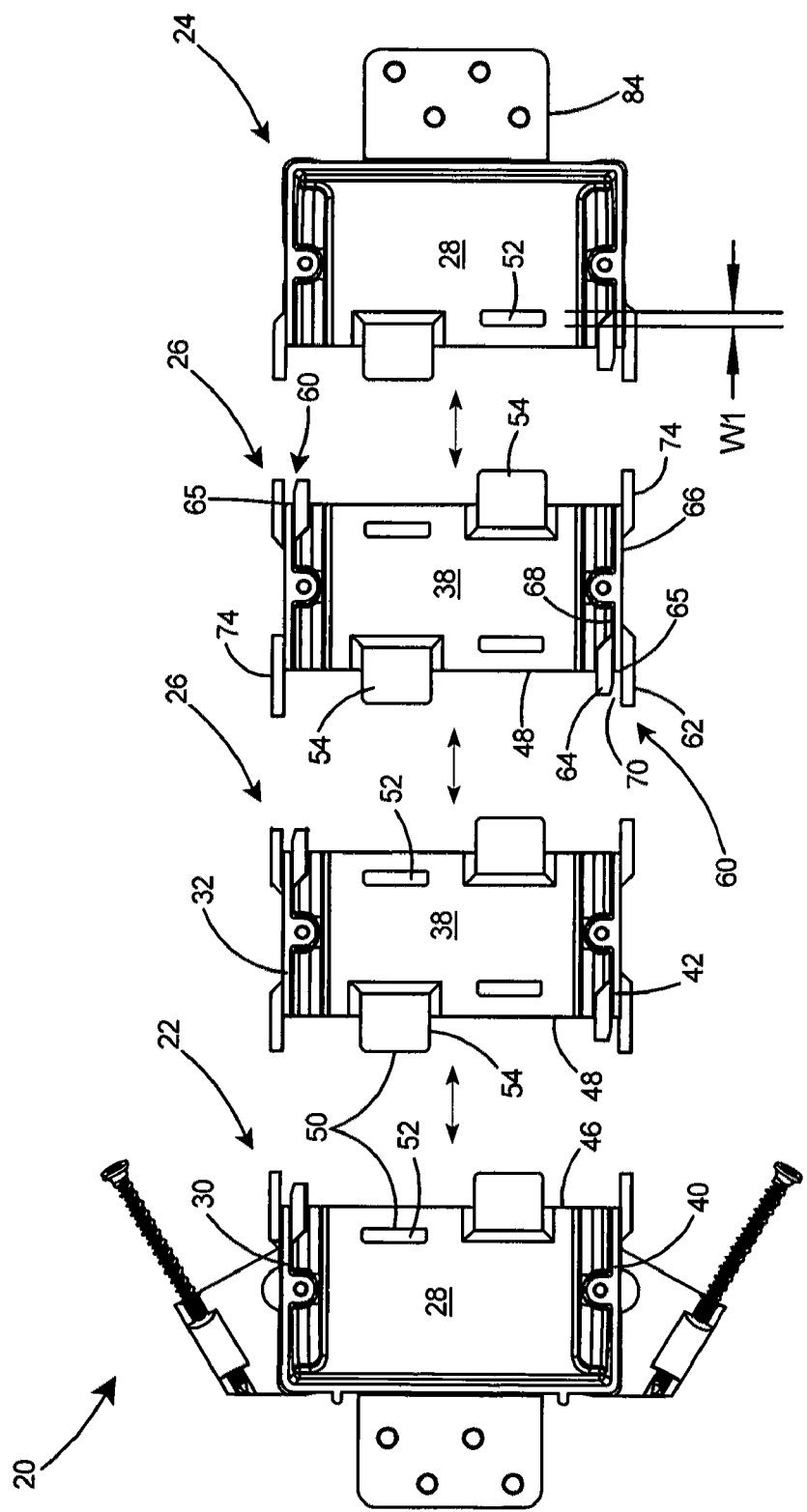
FIG. 3 is a front view of the gangable modular electrical box of FIG. 1.
Figure 4:
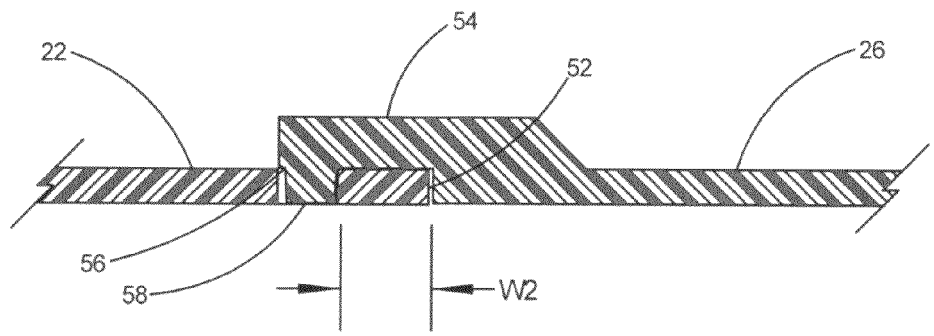
FIG. 4 is a sectional view of the back wall of the gangable electrical box as taken along line 4-4 of FIG. 3.
Figure 5:
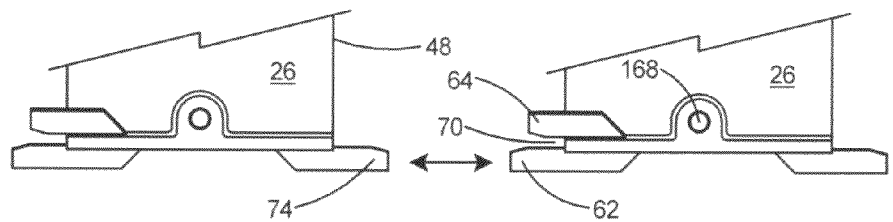
FIG. 5 is a front view of two inner modules in alignment with each other to be joined together and depicting the interlocking arrangement of the side panels of the gangable electrical box.

With reference to FIG. 3, the gangable modular electrical box assembly 20 includes a coupling arrangement 50 for rapidly aligning and connecting two of the bodies together. The coupling arrangement 50 includes a slot 52 and a hooked tab 54 on each of the back walls 28 of the first and second bodies 22 and 24 and on the back walls 38 of the inner body 26. Each of the hooked tabs 54 on a first body are aligned for engagement with a corresponding slot 52 on an adjacent body to which it will be connected. With reference to end body 22 and the adjacent inner body 26 in FIG. 3, the coupling arrangement 50 for coupling the two bodies together includes a pair of slots 52 and a pair of hooked tabs 54 with a hooked tab 54 and a slot 52 at each side edge of the bodies 22, 26. Each slot 52 corresponds to a hooked tab 54 in the adjacent body. As shown in FIG. 4, hooked tabs 54 include ends 56 thereon and a hook 58 extending perpendicular from the end 56 of the hooked tab 54. The hook 58 extending from the hooked tabs 54 ensures that two bodies will couple to one another. As shown in FIG. 4, hook 58 extends into slot 52 to couple the bodies together. Each of the end bodies 22, 24 and inner bodies 26 is preferably molded in one-piece of plastic and a tight tolerance is maintained between the width of the slots 52 and width of the hooks 58. Preferably, the width W1 of the slots (see FIG. 3) is no more than 0.004-inch greater than the width W2 of the hooks 58 (see FIG. 4).

Figure 6:
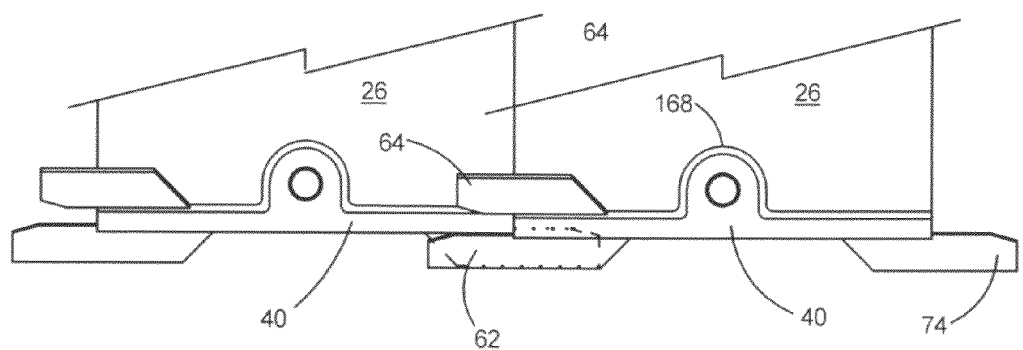
FIG. 6 a front view of the two inner modules of FIG. 5 after they are joined together.

Referring to FIG. 3, the gangable modular electrical box assembly 20 of the present invention further includes an alignment arrangement 60 for aligning the top walls 30, 40 and bottom walls 32, 42 on the assembly. The alignment arrangement 60 includes an outer tab 62 and an inner tab 64 extending from the side edges 46, 48 of each of the bodies 22, 24, and 26. The outer tabs 62 extend from the outer surface 66 of the top walls 30, 40 and bottom walls 32, 42 and the inner tabs 64 extend from the inner surface 68 at the side edges 46 and 48 creating a gap 70 there between. Thus, as shown in FIG. 6, the top walls 30, 40 and bottom walls 32, 42 of the bodies 22, 24, 26 nest within the outer tabs 62 and inner tabs 64 of the adjacent body when two adjacent bodies are coupled together. The alignment arrangement 60 is provided at opposing corners 65 of the inner body.

With reference to FIG. 2, the gangable modular electrical box assembly 20 includes a fastening arrangement 72 for securing two bodies together. The fastening arrangement 72 includes a second tab 74 extending from the outer surface of the top walls 30, 40 and bottom walls 32, 42 of the bodies at the side edges 46 and 48, an aperture 76 in the second tab 74, and a bore 78 in each of the top walls 30, 40 and the bottom walls 32, 42 whereby each of the apertures 76 in the second tabs 74 is aligned with each of the bores 78 in the top and bottom walls when the bodies are coupled together with the coupling arrangement 50. The fastening arrangement 72 further includes fasteners 80 for extending through the second tabs 74 into the bores 78 of the top walls 30, 40 and the bottom walls 32, 42 for securing the bodies 22, 24, and 26 together. As shown in FIG. 3, the second tabs 74 are also provided at opposing corners 65 of the inner bodies 26.

As shown in FIG. 1, gangable modular electrical box assembly 20 includes a front edge 81 on each of the top 30 and 40, bottom 32 and 42, and side walls 34 of the first end body 22, the second end body 24, and the inner body 26. Two mounting arrangements are provided for mounting the assembly to a surface. A first mounting arrangement 82 includes a flange 84 extending outward from the outer surface 86 of the side wall 34 of the end bodies 22 and 24. The flange 84 is preferably parallel with and offset from the front edge 81 of the assembly 20. The flange 84 includes apertures 88 therein for receipt of mounting fasteners 90. A second mounting arrangement 92 includes wings 94 extending from the top wall 30 and the bottom wall 32 of the first end body 22, a boss 96 integral with the wings 94, a bore 98 in the boss, and a captive fastener 99 secured in the bore 98 of the boss 96.

Figure 9:
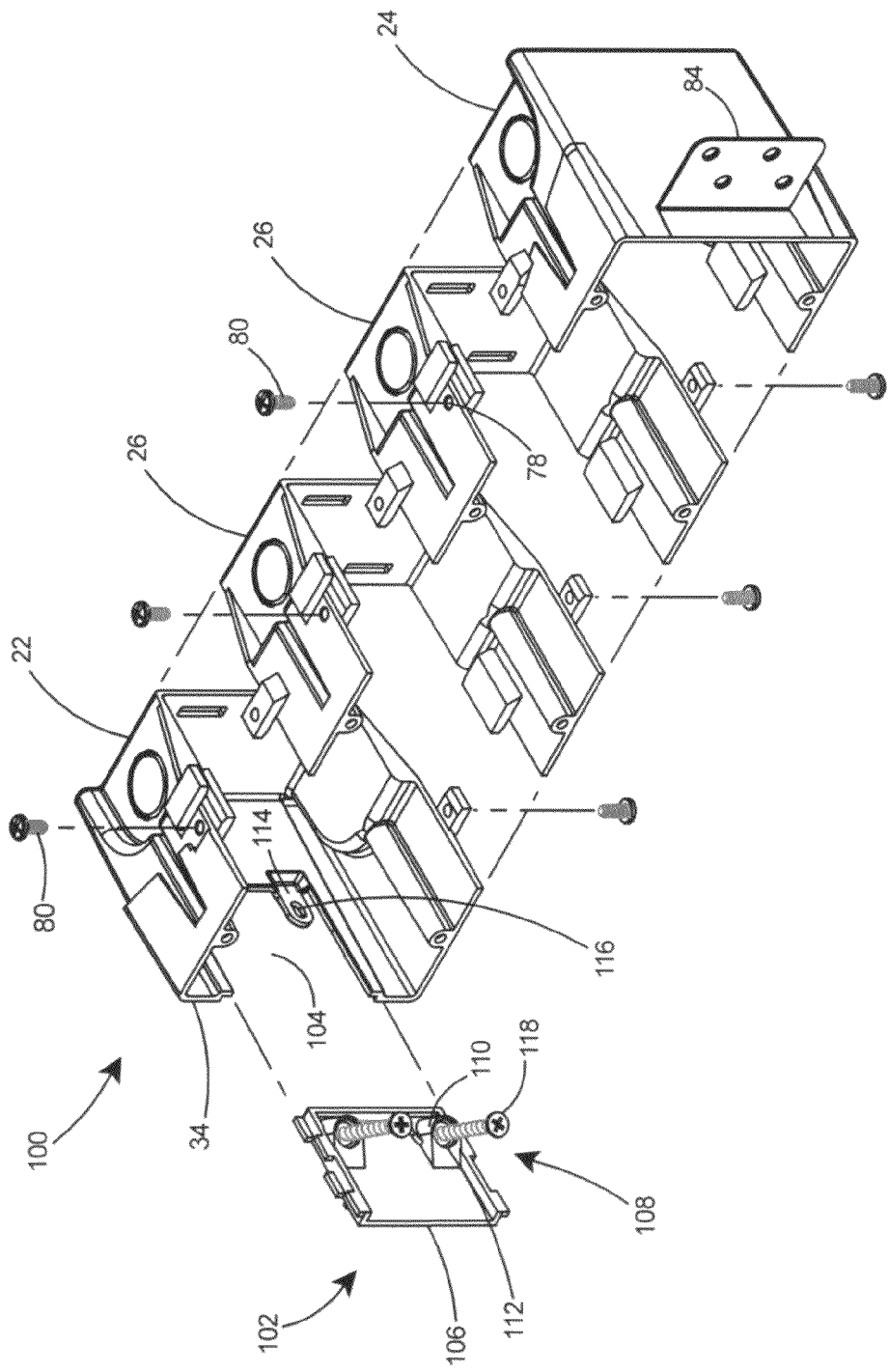
FIG. 9 is an exploded perspective view of a second embodiment of a gangable modular electrical box with the modular components in alignment with each other to be assembled into a four-gang electrical box.

With reference to FIG. 9 there is shown a second embodiment of a gangable modular electrical box assembly 100 according to the present invention. The gangable modular electrical box assembly 100 includes a third mounting arrangement 102 for mounting the assembled multi-gang box to a stud or similar support. The third mounting arrangement 102 includes an open channel 104 in a side wall 34 of first end body member 22, a screw plate 106 for insertion in the channel 104, and a locking arrangement 108 for locking the screw plate 106 into the channel 104. The locking arrangement 108 includes a boss 110 with a bore 112 therein on the screw plate 106 and an arm 114 extending from the side wall 34 adjacent the channel 104. The arm 114 includes an aperture 116 therein and a captive fastener 118 in the boss 110.

Figure 10:
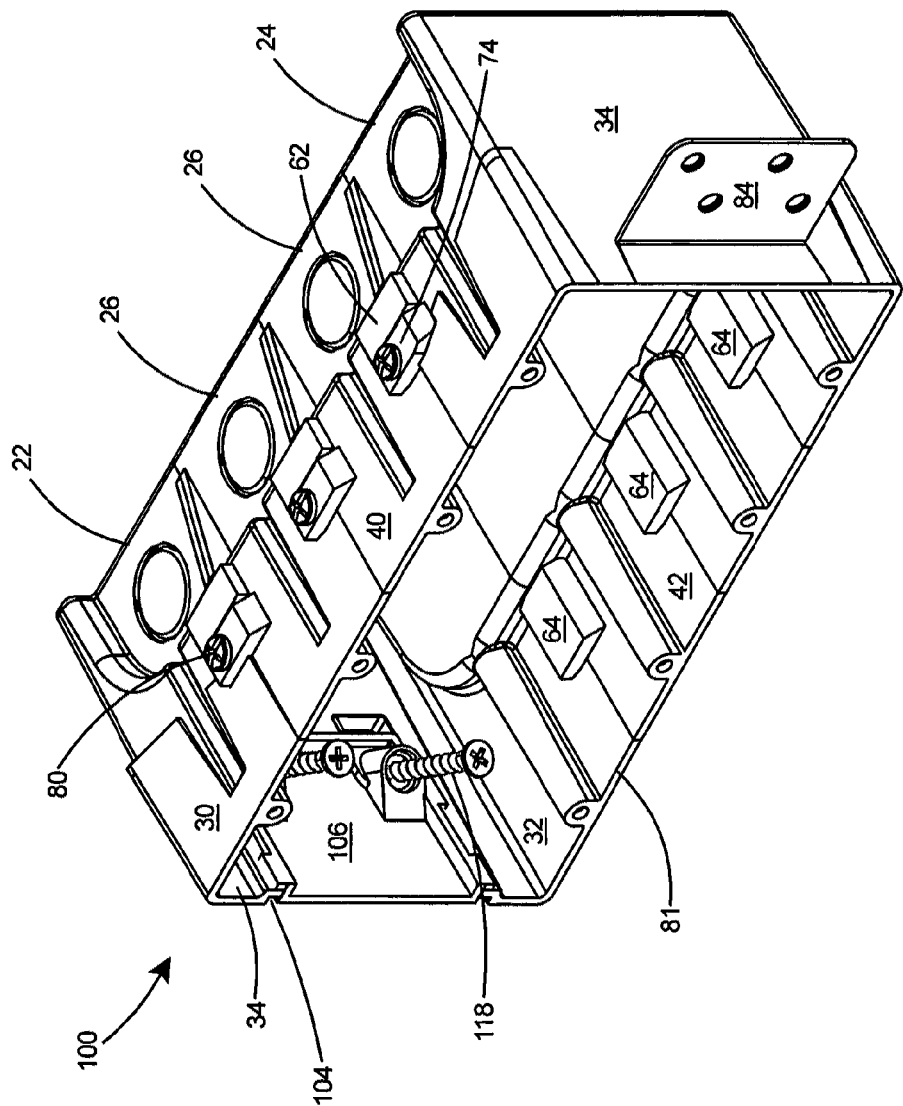
FIG. 10 is a perspective view of the second embodiment of the gangable electrical box according to the present invention assembled in a configuration to provide a four-gang electrical box.
Figure 11:
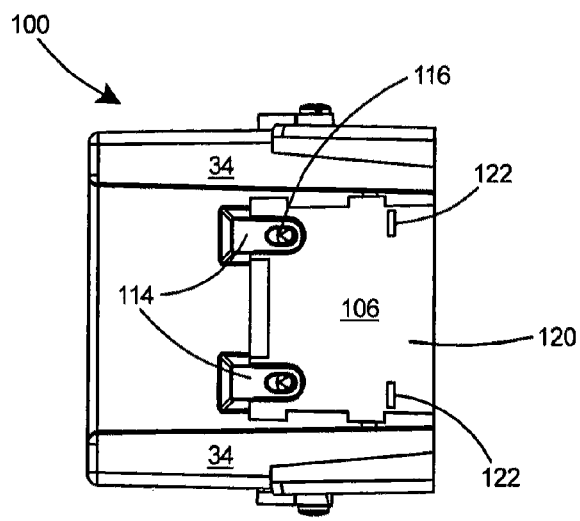
FIG. 11 is a left side view of the gangable electrical box of FIG. 10 including an insertable screw plate that forms a portion of the gangable electrical box.
Figure 12:
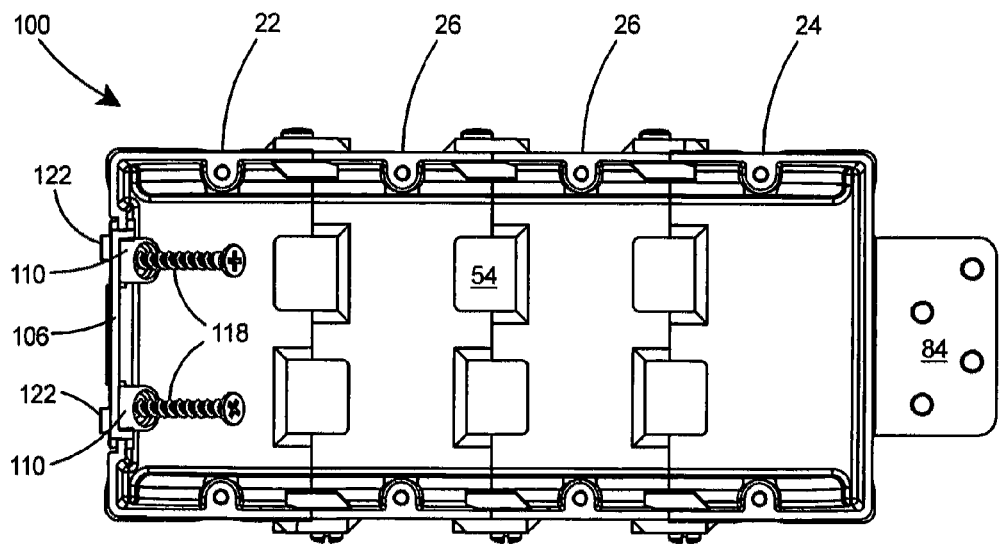
FIG. 12 a front view of the gangable modular electrical box of FIG. 9.

As shown in FIG. 10, after the screw plate 106 is inserted into the channel 104, a portion of the captive fastener 118 is driven into the aperture 116 in the arm 114 (see FIG. 9) thereby locking screw plate 106 into the channel 104 and making it an integral part of gangable modular electrical box assembly 100. As shown in FIG. 11, the sidewall 34 of the assembly 100 includes two arms 114 and the outer surface 120 of the screw plate 106 includes two drywall stops 122 for locating box assembly 100 with respect to a stud or similar support (not shown). To align the multi-gang box 100 with a stud, the outer surface of side wall 34 is placed flush against the side of the stud (not shown) with alignment stops 122 flush against the front of the stud. As shown in FIG. 12, as viewed from the front, screw plate 106 and integral bosses 110 angle captive fasteners 118 toward the front of the box assembly 100 where they will be easily accessible to an installer. After multi-gang box 100 is aligned flush against a stud, captive fasteners 118 are driven fully into bosses 110 and thus fully into the stud.

Figure 13:
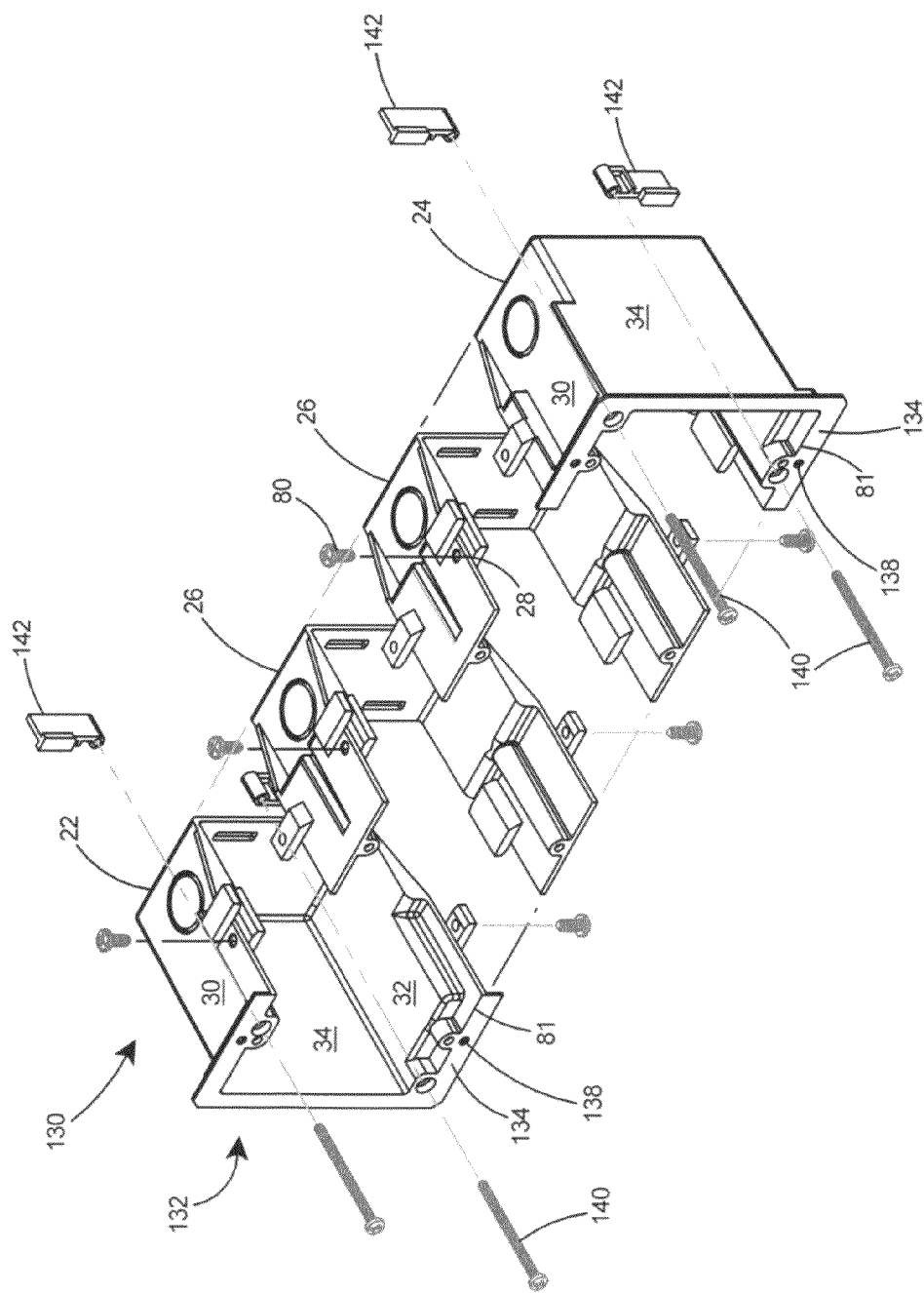
FIG. 13 is an exploded perspective view of a third embodiment of the gangable electrical box of the present invention with the modular components in alignment with each other to be assembled into a four-gang electrical box.
Figure 14:
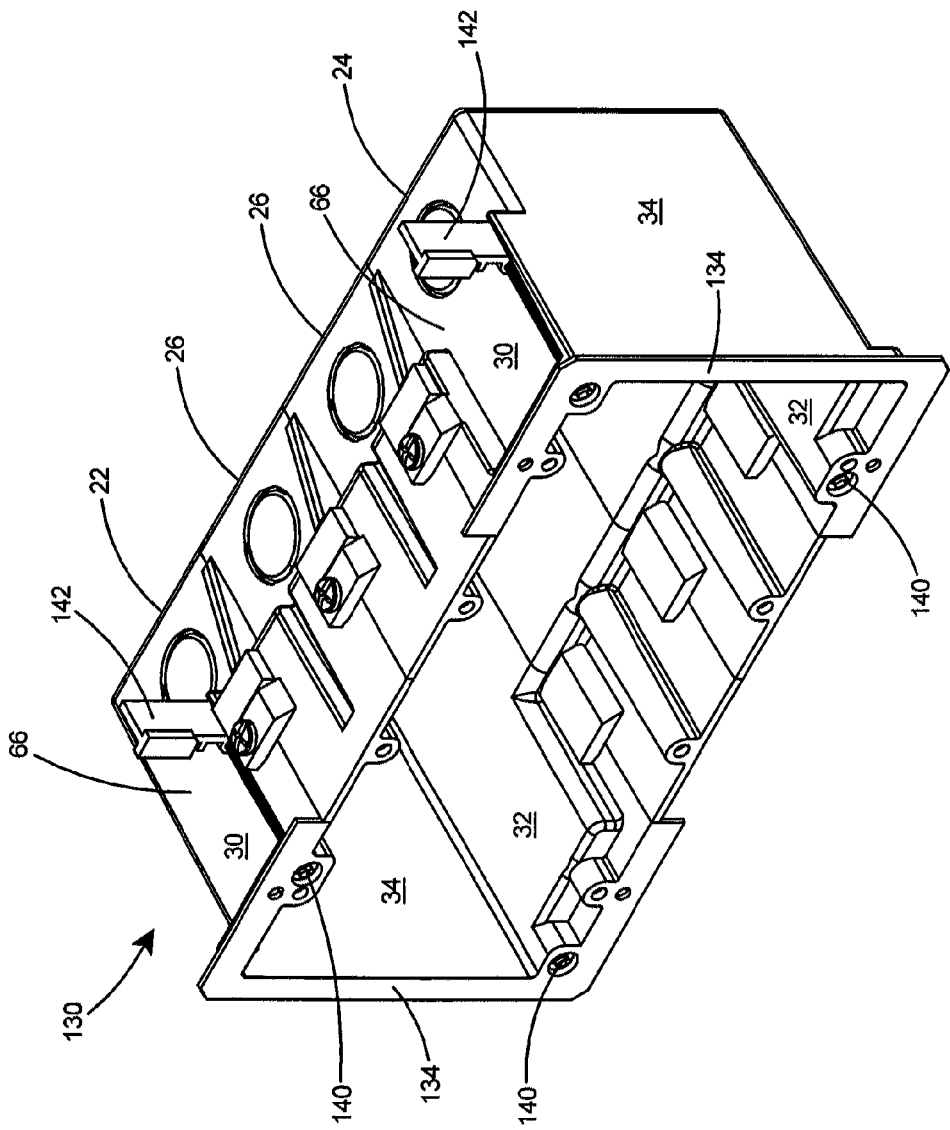
FIG. 14 is a perspective view of the gangable modular electrical box of FIG. 13.

Referring to FIG. 13 there is shown a third embodiment of a gangable modular electrical box assembly 130 according to the present invention. The gangable modular electrical box assembly 130 includes a fourth mounting arrangement 132 including a peripheral flange 134 extending orthogonally from the front edges 81 of the top wall 30, bottom wall 32, and side walls 34 of the end bodies 22 and 24, oversize apertures 138 in the peripheral flange 134, mounting fasteners 140 extending through the oversize apertures 138 in the peripheral flange 134, and rotatable flags 142 connected to the mounting fasteners 140. With the gangable modular electrical box assembly 130 assembled into a multi-gang electrical box as shown in FIG. 14, mounting fasteners 140 are rotated at least 90 degrees counterclockwise to place the flags 142 flush against outer surface 66 of top walls 30 and bottom walls 32 and thereby minimize the outer profile of the box assembly 130. Box assembly 130 can then be inserted into a hole in the drywall or equivalent wall covering on a wall (not shown). After peripheral flange 134 is flush against the drywall, mounting fasteners 140 are each rotated clockwise until the flags 142 are drawn tight against the back surface of the drywall, thereby securing box assembly 130 to the wall.

Figure 18:
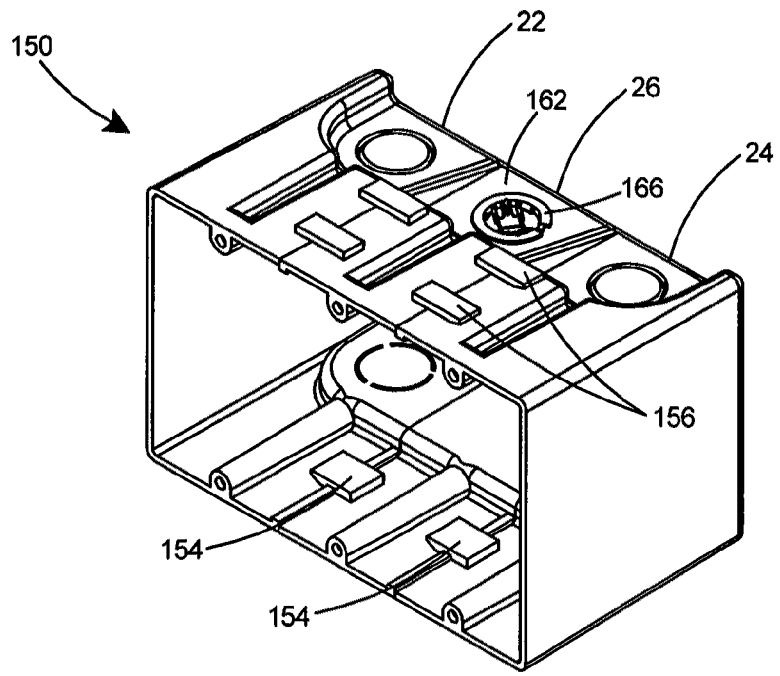
FIG. 18 is a perspective view of a fourth embodiment of a gangable modular electrical box according to the present invention assembled in a configuration to provide a three-gang electrical box.
Figure 19:
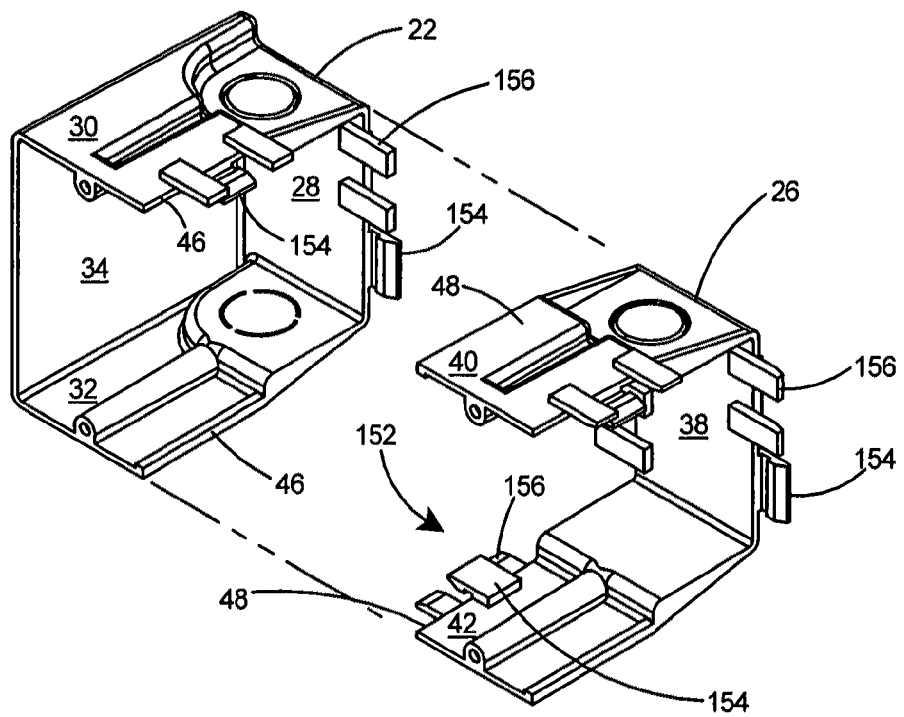
FIG. 19 is an exploded perspective view of a portion of the gangable electrical box of FIG. 18 depicting an end body in alignment with an inner body.

With reference to FIG. 18 there is shown a fourth embodiment of a gangable modular electrical box 150 according to the present invention assembled in a configuration to provide a three-gang electrical box. As shown in FIG. 19, the gangable modular electrical box assembly 150 includes a snap fit fastening arrangement 152 on the assembly for snap-fitting the first end body 22, inner body 26, and second end body 24 (not shown) together. The snap fit fastening arrangement 152 includes a resilient locking tab 154 extending from the side edge 46 of the top wall 30 of the first end body 22 and a resilient locking tab 154 extending from the side edge 48 of the bottom wall 42 of the inner body 26. In addition, a resilient locking tab 154 is included on the back wall 28 of the first end body 22 and the back wall 38 of the inner body 26 and for snap-fitting and locking the back walls 28 and 38 of adjacent modules together. In addition, alignment tabs 156 are provided on the opposite sides of the walls from the locking tabs 154 to assist in aligning the modules or bodies 22, 24, and 26 as they are joined together to form a multi-gang electrical box 150 (see FIG. 18).

Figure 20:
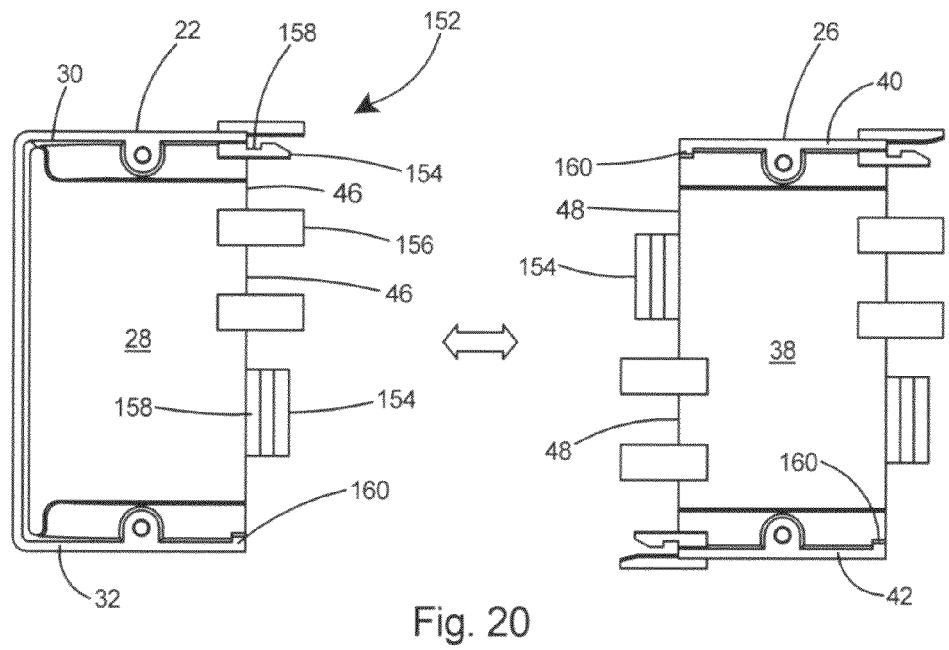
FIG. 20 is a front view of the end body and inner body of FIG. 19 in alignment to be secured together.
Figure 21:
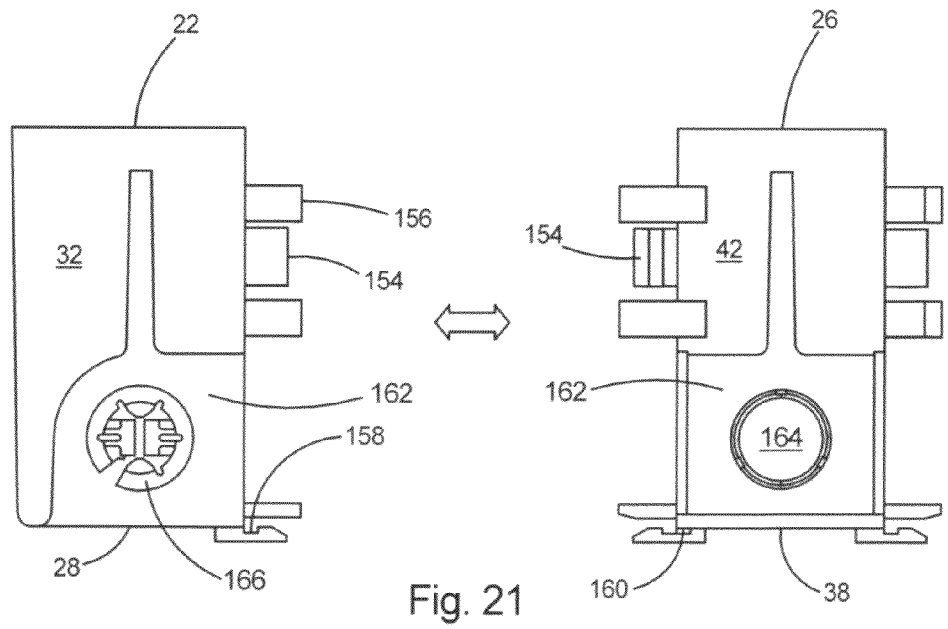
FIG. 21 is a bottom view of the end body and inner body of FIG. 20 in alignment to be secured together.

Referring to FIGS. 20 and 21, the locking tabs 154 of the snap fit fastening arrangement 152 each include a groove 158 therein and the walls 32, 42 include a raised lip 160 at the side edges 46, 48 of the adjacent body. The bodies, of which end body 22 and inner body 26 are shown in the figures, are secured together at the top walls 30, 40 by the resilient locking tab 154 of the first end body 22 engaging the raised lip 160 of the inner body 26 and at the bottom walls 32, 42 by resilient locking tab 154 of inner body 26 engaging the raised lip 160 of the first end body 22.

As shown in FIG. 21, each embodiment of the gangable modular electrical box assembly described herein include recessed areas 162 in the top walls 30, 40 and the bottom walls 32, 42 of the end bodies 22 and 24 and inner body 26 and a knockout 164 in the recessed area 162. The recessed areas 162 in the top and bottom walls enables the use of electrical fittings or connectors such as the BLACK BUTTONB™ push-in connector 166 for connecting non-metallic cable to the multi-gang electrical box. The BLACK BUTTONB™ push-in connector, available from Arlington Industries of Scranton, Pa., is simply pushed into one of the knockouts 164 provided in the recessed area 162. The recessed area 162 prevents the push-in connectors 166 from projecting outward from the sidewalls of the multi-gang electrical box (see FIG. 18) and thus interfering with placement of the multi-gang electrical box in locations where space is tightly restricted.

Figure 22:
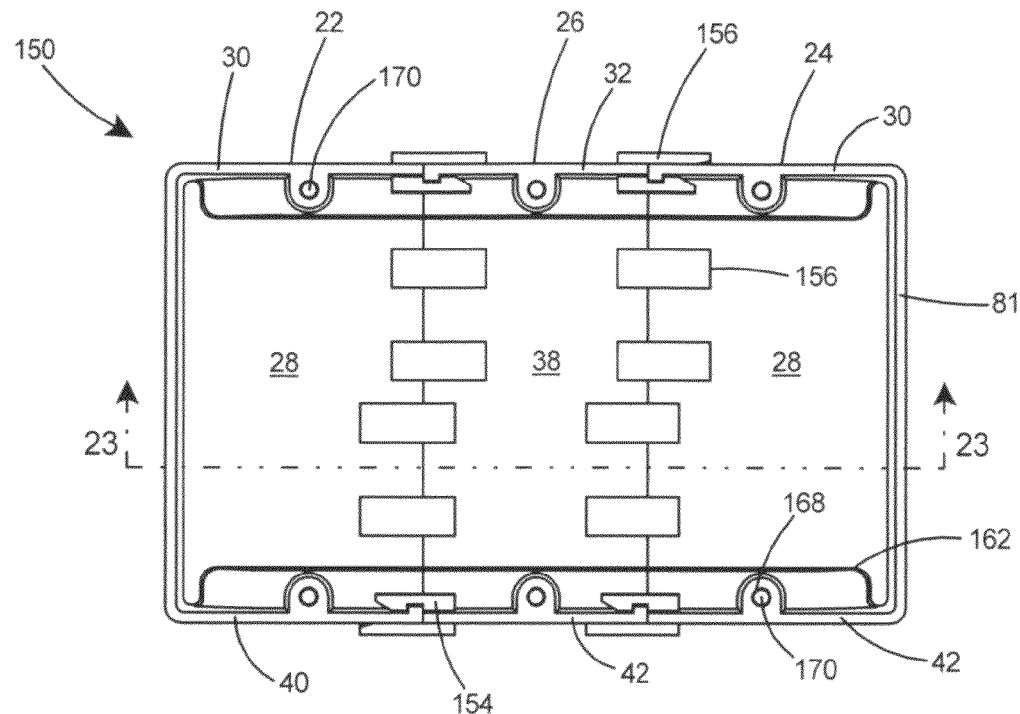
FIG. 22 is a front view of the assembled gangable electrical box including of FIG. 18.
Figure 23:
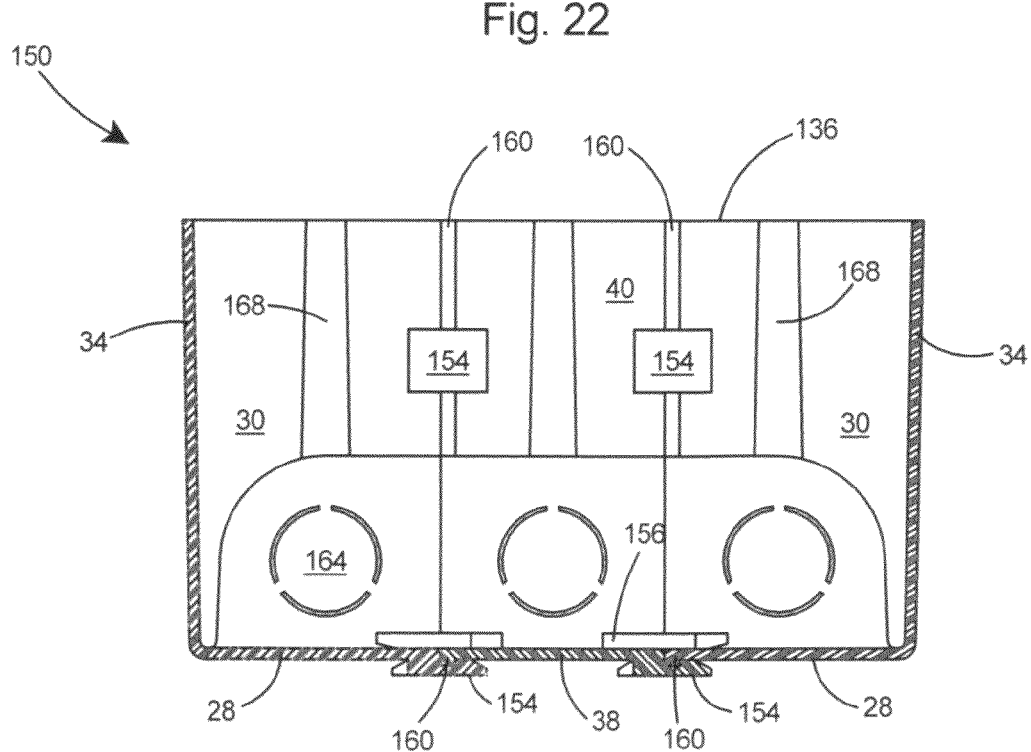
FIG. 23 is a sectional view taken along line 23-23 of FIG. 22.

With reference to the assembled multi-gang electrical box 150 in FIGS. 22 and 23, the inner surfaces 68 of the top 30, 40 and bottom walls 32, 42 each include an integral boss 168 extending from the front edge 81 to the recessed area 162. The integral bosses 168 include bores 170 therein for receipt of fasteners (not shown) for securing an electrical component, such as a switch or a duplex receptacle, to the modular electrical box assembly 150.

Referring to FIGS. 7 and 8, a gangable modular electrical box assembly 20 according to the present invention preferably includes one or more drywall stops 122 on the outer surface 86 of the side walls 34 for locating the multi-gang box 20 with respect to a stud or similar support (not shown). The outer surface 86 of the sidewalls 34 also preferably includes a pair of rails 172 extending there from, the rails 172 being perpendicular to the front edge 81. Preferably one rail 172 is located above and one below the flange 84. The rails 172 include a planar outer edge that provides an abutment surface for squaring and supporting the multi-gang electrical box against a stud or similar supporting surface (not shown).

Preferably, the first end body 22, the second end body 24, and the inner body 26 of a gangable modular electrical box assembly according to the present invention are each molded in one-piece of plastic. Preferably, the plastic is polycarbonate, polyvinyl chloride, acrylonitrile-butadiene styrene, polyethylene, or polypropylene.

Having thus described the invention with reference to a preferred embodiment, it is to be understood that the invention is not so limited by the description herein but is defined as follows by the appended claims.

What is claimed is:

1. A gangable modular electrical box assembly, comprising:
    a first end body having a back wall with a top wall, a bottom wall, a side wall extending substantially perpendicular from said back wall, and an open side;
    a second end body having a back wall with a top wall, a bottom wall, a side wall extending substantially perpendicular from said back wall, and an open side;
    said open side of said first end body and said second end body including side edges on said back wall, said top wall, and said bottom wall;
    an inner body for optional insertion between said first end body and said second end body, said inner body including a back wall with a top wall and a bottom wall extending substantially perpendicular from said back wall, and two open sides;
    said open sides of said inner body including side edges on said back wall, said top wall, and said rear wall;
    said side edges of said first and second end bodies and said side edges of said inner body are of substantially equal dimensions thereby enabling said side edges to join flush with each other when said open sides of said bodies are joined together; and
    a coupling arrangement for rapidly aligning and connecting two of said bodies together, said coupling arrangement including a slot and a hooked tab on each of said back walls of said first, second, and inner bodies whereby said hooked tab on a first of said bodies is aligned for engagement with said slot on a second of said bodies and said hooked tab on said second of said bodies is aligned for engagement with said slot on said first of said bodies.

2. The gangable modular electrical box assembly of claim 1 wherein said coupling arrangement includes a pair of slots and a pair of hooked tabs with a first of said hooked tabs on a first of said bodies and a second of said hooked tabs on a second of said bodies and a slot in each of said bodies corresponding to each of said hooked tabs.

3. The gangable modular electrical box assembly of claim 1 including an alignment arrangement on said assembly wherein
    said top and bottom walls of said bodies include an inner surface and an outer surface;
    an outer tab extending from said outer surface of said bodies at said side edge; and
    an inner tab extending from said inner surface of said bodies at said side edge, whereby said top walls and bottom walls of said bodies nest within said outer and inner tabs when said bodies are coupled together.

4. The gangable modular electrical box assembly of claim 1 including a mounting arrangement for mounting said assembly to a surface.

5. The gangable modular electrical box assembly of claim 4 wherein said mounting arrangement includes
    a front edge on each of said top, bottom, and side walls of said first end body, said second end body, and said inner body; and
    a flange extending outward from said outer surface of said side wall of said first end body, said flange parallel with said front edge of said body portion and said flange offset from said front edge of said body portion, said flange including apertures therein for receipt of mounting fasteners.

6. The gangable modular electrical box assembly of claim 4 wherein said mounting arrangement includes
    wings extending from said top wall and said bottom wall of said first end body;
    a boss integral with said wings;
    a bore in said boss; and
    a captive fastener secured in said bore of said boss.

7. The gangable modular electrical box assembly of claim 4 wherein said mounting arrangement includes
    a front edge on each of said top, bottom, and side walls of said first end body and said second end body;
    a peripheral flange extending orthogonally from said front edges of said top, bottom, and side walls;
    apertures in said peripheral flange;
    fasteners extending through said apertures in said peripheral flange; and
    rotatable flags connected to said fasteners.

8. The gangable modular electrical box assembly of claim 5 wherein said top wall and said bottom wall of said bodies include recessed areas therein.

9. The gangable modular electrical box assembly of claim 8 wherein said recessed areas include a knockout area therein.

10. The gangable modular electrical box assembly of claim 8 wherein
said inner surfaces of said top and bottom walls each include an integral boss extending from said front edge to said recessed area; and
said integral bosses include bores therein for receipt of fasteners for securing an electrical component to said modular electrical box assembly.

11. The gangable modular electrical box assembly of claim 5 wherein
said side walls of said first end body includes an inner and an outer surface; and
said outer surface includes a pair of rails extending therefrom, said rails perpendicular to said front edge, said rails located above and below said flange.

12. The gangable modular electrical box assembly of claim 4 wherein said mounting arrangement includes
an open channel in said side wall;
a screw plate for insertion in said channel; and
a locking arrangement for locking said screw plate in said channel.

13. The gangable modular electrical box assembly of claim 12 wherein said locking arrangement includes
a boss on said screw plate;
an arm on said side wall extending adjacent said channel, said arm including an aperture therein; and
a captive fastener in said boss, said captive fastener including a portion thereof extending into said aperture in said arm.

14. The gangable modular electrical box assembly of claim 1 wherein
said hooked tabs include ends;
a hook on said end of said hooked tabs; and
said hooks extend perpendicular from said hooked tabs.

15. The electrical box of claim 1 wherein
said first end body, said second end body, and said inner body are each molded in one-piece of plastic; and
said plastic is selected from the group including polycarbonate, polyvinyl chloride, acrylonitrile-butadiene styrene, polyethylene, or polypropylene.

16. A gangable modular electrical box assembly, comprising:
a first end body having a back wall with a top wall, a bottom wall, a side wall extending substantially perpendicular from said back wall, and an open side;
a second end body having a back wall with a top wall, a bottom wall, a side wall extending substantially perpendicular from said back wall, and an open side;
said open side of said first end body and said second end body including side edges on said back wall, said top wall, and said bottom wall;
an inner body for optional insertion between said first end body and said second end body, said inner body including a back wall with a top wall and a bottom wall extending substantially perpendicular from said back wall, and two open sides;
said open sides of said inner body including side edges on said back wall, said top wall, and said rear wall;
said side edges of said first and second end bodies and said side edges of said inner body are of substantially equal dimensions thereby enabling said side edges to join flush with each other when said open sides of said bodies are joined together;
a fastening arrangement on said assembly, said fastening arrangement including a tab extending from said outer surface of said top and bottom walls of said bodies at said side edges, an aperture in said second tab, a bore in each of said top walls and said bottom walls whereby each of said apertures in said second tabs is aligned with each of said bores in said top and bottom walls when said bodies are coupled with said fastening arrangement, and fasteners for extending through said second tabs into said bores of said top walls and said bottom walls for securing said bodies together.

* * * * *